US007899495B2

(12) United States Patent
Laroia et al.

(10) Patent No.: US 7,899,495 B2
(45) Date of Patent: Mar. 1, 2011

(54) METHODS AND APPARATUS FOR SUPPORTING MULTIPLE CONNECTIONS

(75) Inventors: Rajiv Laroia, Far Hills, NJ (US); Das Arnab, Summit, NJ (US); Murari Srinivasan, Palo Alto, CA (US); Pablo Anigstein, Gillette, NJ (US); Vladimir Parizhsky, New York, NY (US); M. Scott Corson, Gillette, NJ (US)

(73) Assignee: Qualcomm Incorporated, San Diego, CA (US)

( * ) Notice: Subject to any disclaimer, the term of this patent is extended or adjusted under 35 U.S.C. 154(b) by 796 days.

(21) Appl. No.: 11/486,824

(22) Filed: Jul. 14, 2006

(65) Prior Publication Data

US 2008/0014991 A1    Jan. 17, 2008

(51) Int. Cl.
*H04B 1/38*    (2006.01)
(52) U.S. Cl. ............... 455/561; 455/452.1; 455/452.2; 455/450; 455/403; 455/417; 370/331
(58) Field of Classification Search ............... 455/561, 455/452.1, 452.2, 450, 403, 417; 370/331
See application file for complete search history.

(56) References Cited

U.S. PATENT DOCUMENTS

| 6,768,908 | B1 * | 7/2004 | Jalloul et al. ............ 455/442 |
| 6,799,039 | B2 * | 9/2004 | Wu et al. ............... 455/436 |
| 6,862,449 | B1 | 3/2005 | Mohebbi et al. | |
| 6,889,045 | B2 * | 5/2005 | Pan et al. .............. 455/436 |
| 7,127,210 | B2 * | 10/2006 | Aoyagi ................ 455/41.2 |
| 2003/0040306 | A1 * | 2/2003 | Kentaro et al. .......... 455/422 |
| 2005/0089007 | A1 * | 4/2005 | Semper .................. 370/349 |
| 2006/0003773 | A1 * | 1/2006 | Miyata et al. ........... 455/452.2 |
| 2008/0205341 | A1 * | 8/2008 | Koh et al. .............. 370/331 |

FOREIGN PATENT DOCUMENTS

| WO | WO0139403 A1 | 5/2001 |
| WO | WO2004068739 A1 | 8/2004 |

OTHER PUBLICATIONS

3GPP TS 25.214 V1.0 0: "3rd Generation Partnership Project (3GPP); Technical Specification Group (TSG); Radio Access Network (RAN); Working Group 1 (WG1); Spreading and Modulation (FDD) Physical layer procedures (FDD)," TS 25.214 V1.0.0., Apr. 1999, pp. 1-31, XP002180896 pp. 15-16, paragraph 5.2.3.4 1,5.2.3. 4.3,5.2.3.4,5,5.2.3,4.6.
International Search Report and Written Opinion - PCT/US2007/073481, International Search Authority - European Patent Office - Mar. 20, 2008.

* cited by examiner

*Primary Examiner* — Sanh D Phu
(74) *Attorney, Agent, or Firm* — Milan I. Patel; Jonathan T. Velasco

(57) ABSTRACT

Systems and methodologies are described that facilitate supporting multiple connections associated with a wireless terminal. Notifications may be provided to a primary base station upon establishment and/or removal of connections between the wireless terminal and secondary base station(s). Additionally, the multiple connections may be evaluated and a preferred connection from the set of multiple connections may be utilized to transfer data to the wireless terminal over a downlink connection.

18 Claims, 11 Drawing Sheets

METHODS AND APPARATUS FOR SUPPORTING MULTIPLE CONNECTIONS

BACKGROUND

I. Field

The following description relates generally to wireless communications, and more particularly to supporting handoffs and multiple connections in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Handoffs are commonly employed in wireless communications systems to transfer an ongoing communication session from one base station connected to a core network to a second base station connected to the core network. Oftentimes, hard handoffs may be employed where a wireless terminal may be connected to one base station at a time. Thus, to transition to a disparate base station, the wireless terminal drops a radio link for a period of time prior to connecting to the new base station (e.g., make before break).

Another conventional technique for handing off typically utilized in CDMA systems employs soft handoffs where a wireless terminal may be connected to several base stations simultaneously. The set of base stations to which the wireless terminal is connected in CDMA systems may be referred to as an active set for the wireless terminal. Conventionally, downlink soft handoffs oftentimes utilize simultaneous transmission to the wireless terminal from disparate base stations, which may be inefficient, since multiple copies of a signal may be transmitted to the wireless terminal. Further, multiple, redundant, over the air transmission may be particularly inefficient for higher bit rate signals related to IP data.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating supporting multiple connections associated with a wireless terminal. Notifications may be provided to a primary base station upon establishment and/or removal of connections between the wireless terminal and secondary base station(s). Additionally, the multiple connections may be evaluated and a preferred connection from the set of multiple connections may be utilized to transfer data to the wireless terminal over a downlink connection.

According to related aspects, a method that facilitates supporting multiple connections associated with a wireless terminal is described herein. The method may comprise providing a first connection to a first base station. Also, the method may include receiving a signal emanating from a second base station. Further, the method may include establishing a second connection to the second base station. Additionally, the method may include sending a notification to the first base station indicating establishment of the second connection.

Another aspect relates to a wireless communications apparatus that may include a memory that retains instructions for selecting a preferred base station from a first base station and a second base station. Further, a processor may evaluate a first connection associated with the first base station and a second connection associated with the second base station, transmit link preference information that identifies the preferred base station based upon the retained instructions, and obtain a packet by way of the preferred base station.

Yet another aspect relates to a wireless communications apparatus for providing notifications associated with newly established connections to a primary base station. The wireless communications apparatus may include means for providing a first connection to a first base station; means for obtaining a signal emanating from a second base station; means for establishing a second connection to the second base station; and means for transmitting a notification to the first base station indicating establishment of the second connection.

Still another aspect relates to a machine-readable medium having stored thereon machine-executable instructions for obtaining a signal emanating from a second base station, creating a second connection to the second base station, and transmitting a notification to a first base station indicating establishment of the second connection.

In accordance with another aspect, a processor is described herein, wherein the processor may execute instructions for selecting a preferred connection from a first connection to a first base station and a second connection to a second base station. Also, the processor may execute instructions for transmitting link preference information based upon the selected, preferred connection. The processor may further execute instructions for receiving a packet by way of the selected, preferred connection.

According to other aspects, a method that facilitates routing packets to be transmitted to a wireless terminal is described herein. The method may include determining whether a base station is a preferred base station by evaluating received link preference information. Further, the method may comprise transmitting a packet to a wireless terminal when the base station is the preferred base station.

Yet another aspect relates to a wireless communications apparatus that may include a memory that retains packets obtained from a core network routed towards the wireless terminal. Further, a processor may determine whether a primary base station is a preferred base station, retain a copy of the packets when the primary base station is not the preferred base station, and forward the packets to a secondary base station.

Another aspect relates to a wireless communications apparatus for routing packets. The wireless communications apparatus may include means for evaluating whether a base station is a primary base station, means for determining whether the base station is a preferred base station, and means for routing packets based upon whether the base station is the primary base station and whether the base station is the preferred base station.

Still another aspect relates to a machine-readable medium having stored thereon machine-executable instructions for determining whether a base station is a preferred base station and transmitting packets to a wireless terminal when the base station is determined to be the preferred base station.

In accordance with another aspect, a processor is described herein, wherein the processor may execute instructions for receiving link preference information from a wireless terminal. Further, the processor may execute instructions for evaluating the link preference information to determine whether a base station is a preferred base station. Moreover, the processor may execute instructions for transmitting packets to the wireless terminal when the base station is the preferred base station.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
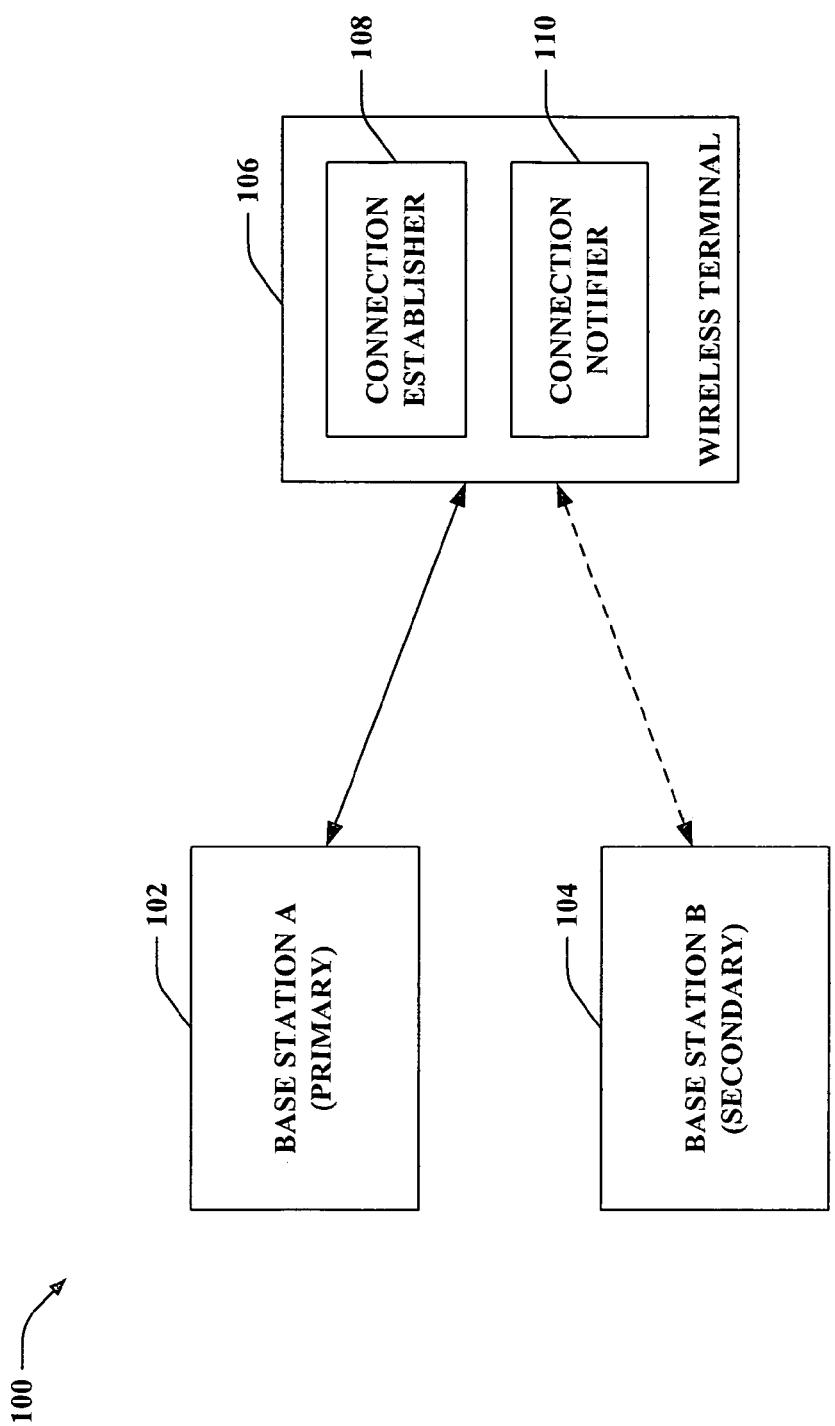
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise base stations (e.g., base station A 102, base station B 104, etc.) that receive, transmit, repeat, etc., wireless communication signals to a wireless terminal 106. Further, it is contemplated that system 100 may include any number of base stations similar to base stations 102-104 and/or any number of wireless terminals similar to wireless terminal 106. Base stations 102-104 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base stations 102-104 may be a fixed station and/or mobile. Wireless terminal 106 can be, for example, a cellular phone, a smart phone, a laptop, a handheld communication device, a handheld computing device, a satellite radio, a global positioning system, a PDA, and/or any other suitable device for communicating over wireless communication system 100. Also, wireless terminal 106 may be fixed or mobile.

Wireless terminal 106 may communicate with base stations 102-104 (and/or disparate base station(s)) on a downlink and/or an uplink channel at any given moment. The downlink refers to the communication link from base stations 102-104 to wireless terminal 106, and the uplink channel refers to the communication link from wireless terminal 106 to base stations 102-104. Base stations 102-104 may further communicate with other base station(s) and/or any disparate devices (e.g., servers) (not shown) that may perform functions such as, for example, authentication and authorization of wireless terminal 106, accounting, billing, and so on.)

System 100 enables establishing connections to multiple base stations to facilitate routing downlink messages. For example, system 100 may be an Orthogonal Frequency Division Multiplexing (OFDM) based system; however, the claimed subject matter is not so limited. System 100 may be an Internet Protocol (IP) routed system and when wireless terminal 106 is connected to one base station (e.g., base station A 102), that base station may connect to a core network (not shown). The core network may route packets for wireless terminal 106 to such base station (e.g., base station A 102). Thus, designating a base station as a primary base station relates to such base station being the point to which the core network routes the packets directed towards wireless terminal 106. Further, when wireless terminal 106 connects to any additional base station(s) (e.g., base station B 104), base station A 102 may continue to be the primary base station unless modified by wireless terminal 106. Base station(s) (e.g., base station B 104) connected to wireless terminal 106 other than the primary base station (e.g., base station A 102) may be referred to as secondary base station(s).

System 100 facilitates macrodiversity by allowing transmission to wireless terminal 106 from two or more base stations 102-104; such transmissions need not be simultaneous. Wireless terminal 106 may include a connection establisher 108 and a connection notifier 110. Connection establisher 108 may establish a connection and/or terminate a connection with one or more base stations (e.g., base stations 102-104). According to an example, wireless terminal 106 may be connected to a first base station and connection establisher 108 may set up a connection with a second base station; however, the claimed subject matter is not so limited as it is contemplated that wireless terminal 106 may be connected to any number of base stations and any number of additional connections may be established and/or terminated by connection establisher 108. Connection notifier 110 may provide information to a primary base station (e.g., base station A 102) regarding establishment and/or removal of connections between wireless terminal 106 and any disparate base station(s) (e.g., base station B 104); such information may be, for instance, a secondary link notification message, a connection drop notification message, and so forth.

By way of example, wireless terminal 106 may be connected to base station A 102. Wireless terminal 106 may decide (e.g., based on a determination of a signal strength of a received beacon signal or pilot signal, signal to noise ratio (SNR), signal to interference ratio (SIR), base station load, type of traffic, etc.) to set up a connection with base station B 104 while remaining connected to base station A 102. For example, an expedited handoff may be utilized by wireless terminal 106 to connect with base station B 104; however, the claimed subject matter is not so limited. According to this example, wireless terminal 106 may transmit a handoff request to base station B 104 via the preexisting connection with base station A 102 and also receive a handoff response from base station B 104 through the connection with base station A 102. The handoff response may include information such as, for instance, an allocated access slot, an identifier, timing related data, etc., which may be utilized by wireless terminal 106 in association with establishing the connection with base station B 104 (e.g., by effectuating physical layer access).

When connection establisher 108 sets up the connection with secondary base station B 104, connection notifier 110 of wireless terminal 106 may inform primary base station A 102 regarding the connection between wireless terminal 106 and secondary base station B 104. Connection notifier 110 may provide a secondary link notification message to base station A 102 indicating that wireless terminal 106 has a new connection (e.g., with secondary base station 104) as well as identifying secondary base station B 104. For instance, the identity (e.g., at least a partial identifier) of secondary base station B 104 may be obtained from a beacon signal emanating from base station B 104 (e.g., receive a few identification bits from beacon of base station B 104 which may be included as part of the secondary link notification message). Base station A 102 may utilize a neighbor discovery protocol (e.g., neighbor list) to resolve the identity of the base station corresponding to such identification bits. According to an example, based upon the identification bits (e.g., 11 bits), base station A 102 may determine an IP address associated with base station B 104 to enable forwarding packets. Additionally or alternatively, base station A 102 may use the IP address derived from the identification bits either directly and/or to contact base station B 104 to enable obtaining further information. Pursuant to a further illustration, upon establishing a connection between base station B 104 and wireless terminal 106, base station B 104 may send a full identifier in a message to wireless terminal 106, which may be conveyed by wireless terminal 106 to base station A 102 to enable packet forwarding.

According to an illustration, primary base station A 102 may receive packets from the core network and forward them to wireless terminal 106. Thereafter, primary base station A 102 may obtain a notification from connection notifier 110 that indicates a connection has been formed between wireless terminal 106 and secondary base station B 104. Primary base station A 102 thereafter may decide to continue to forward the received packets from the core network directly to wireless terminal 106. According to another example, primary base station A 102 may bicast the received packets. When bicasting the packets, primary base station A 102 may retain a copy of packet(s) received from the core network for its queue, replicate the packet(s) and forward the replicated packet(s) to secondary base station B 104.

Figure 2:
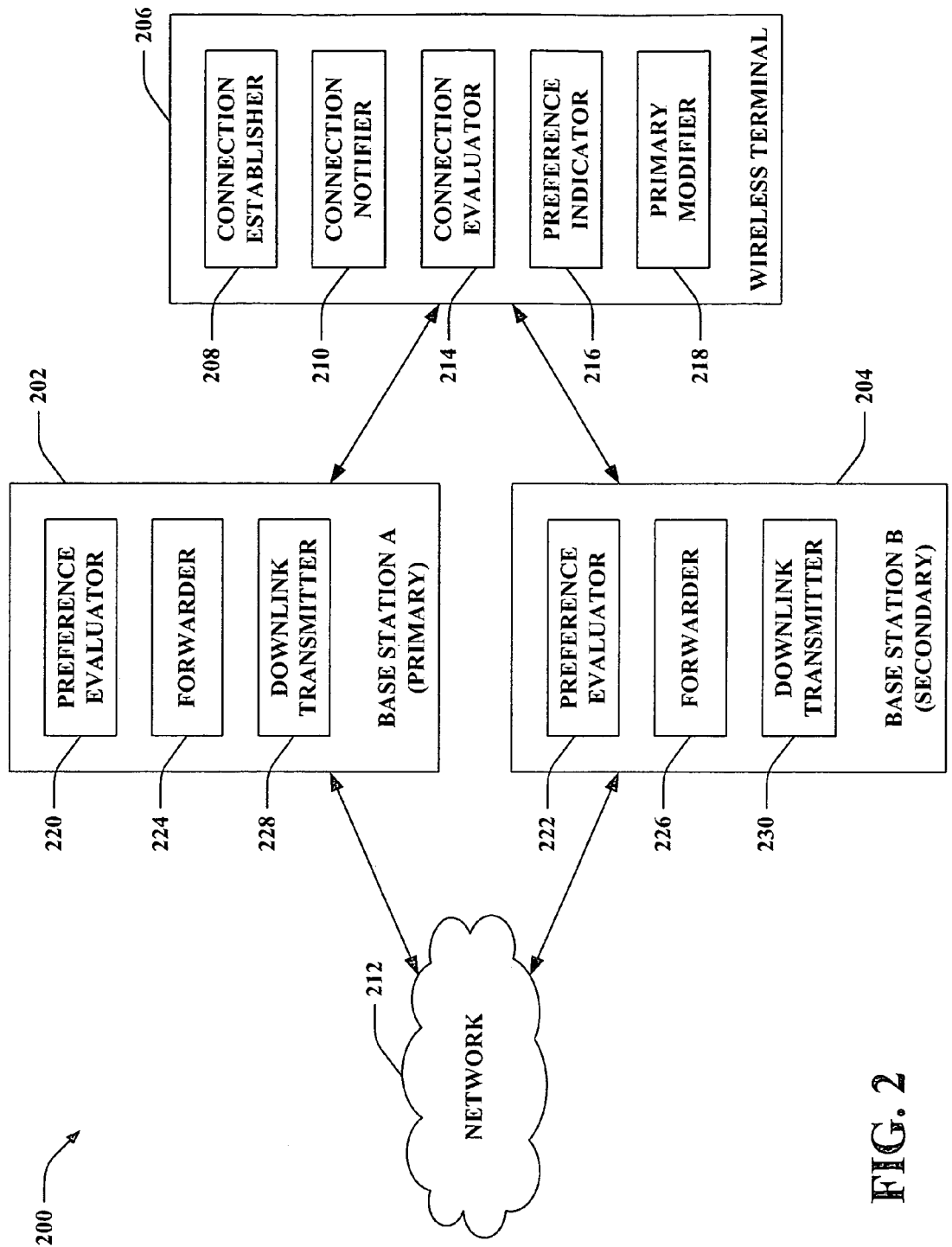
FIG. 2 is an illustration of a system that facilitates routing packets based upon a preference communicated by a wireless terminal to any connected base station(s).

Referring now to FIG. 2, illustrated is a system 200 that facilitates routing packets based upon a preference communicated by a wireless terminal to any connected base station(s). System 200 includes a base station A 202, which may be a primary base station, and a base station B 204; however, any number of additional base stations may be included in system 200. Further, a wireless terminal 206 is included in system 200. Wireless terminal 206 may include a connection establisher 208 and a connection notifier 210, which may be utilized to form and/or end a connection between wireless terminal 206 and any base station (e.g., base station B 204) and thereafter provide notification(s) related to establishment and/or termination of the connection to a primary base station (e.g., base station A 202) associated with wireless terminal 206. System 200 may also include a network 212 (e.g., core network) that may transmit packets intended for wireless terminal 206 to the primary base station (e.g., base station A 202) associated with wireless terminal 206.

Wireless terminal 206 may also include a connection evaluator 214, a preference indicator 216, and/or a primary modifier 218. Wireless terminal 206 may analyze each base station connection by utilizing connection evaluator 214. For instance, connection evaluator 214 may determine that at a particular time a connection with base station A 202 is superior to a connection with base station B 204, while at a disparate time the connection with base station B 204 is better in comparison to the connection with base station A 202. Connection evaluator 214 may evaluate factors related to the connections such as signal strength, SNR, SIR, base station load, data type, etc. to select a preferred link. It is contemplated that connection evaluator 214 may repeatedly analyze connections at any predetermined and/or dynamically varying time interval (e.g., 5 ms).

Based upon the analysis effectuated with connection evaluator 214, a preferred link may be selected. Preference indicator 216 may perform signaling to provide information associated with the preference to connected base stations 202-204. For example, preference indicator 216 may utilize a dedicated control channel (DCCH) to send preferred link information to each of the connected base stations 202-204. When wireless terminal 206 is connected to more than one base station, a dual link mode may be utilized. For instance, a control channel may be set up with each of the base stations 202-204 (e.g., a control channel initialized for uplink to base station A 202 and a disparate control channel initialized for uplink to base station B 204). By way of illustration, preference indicator 216 may set a particular bit on the control channels corresponding to each of the connected base stations 202-204 to notify the base stations 202-204 whether or not they are the preferred base station. For example, the preferred base station may be a base station selected by wireless terminal 206 to transmit over a downlink to wireless terminal 206 at a particular time (e.g., regardless whether such base station is the primary base station and/or a secondary base station). Pursuant to an illustration, preference indicator 216 may select a preferred base station on a fast time scale (e.g., on the order of milliseconds).

Wireless terminal 206 may also include primary modifier 218 that may be employed to select a primary base station. For instance, base station A 202 may be the primary base station to which the network forwards packets to be transmitted to wireless terminal 206 at a particular time; thereafter, primary modifier 218 may be utilized to facilitate selecting base station B 204 as the primary base station. Primary modifier 218 may be a mobile IP client within wireless terminal 206. A protocol exchange between such mobile IP client and a foreign agent in network 212, along with a home agent situated in the core network, may facilitate changing the primary base station, which may modify routing associated with wireless terminal 206. Although described in terms of one primary base station herein, it is contemplated that any number of primary base stations may be concurrently employed.

The following scenario illustrates an example to which the claimed subject matter is not limited. At a particular time, wireless terminal 206 may be connected to one base station, base station A 202. Thereafter, wireless terminal 206 may create a connection with base station B 204 by utilizing connection establisher 208. Connection notifier 210 may send a secondary link notification message to base station A 202 that describes the new connection with base station B 204; thus, base station A 202 is aware that two base stations can potentially serve wireless terminal 206. Further, assuming that no information has been obtained from primary modifier 218 (e.g., since primary modifier 218 may work with the combination of the foreign agent in base station B 204 and a home agent in the core network to explicitly inform base station A 202 through a protocol mechanism if it is no longer the primary base station), base station A 202 realizes it is the primary base station and base station B 204 is a secondary base station.

In accordance with the above scenario, wireless terminal 206 may also prompt connected base stations 202-204 to transition into dual link mode; previously, base station A 202 may have utilized single link mode. Single link mode and dual link mode relate to dedicated control channels. Single link mode may be utilized when wireless terminal 206 is connected to one base station (e.g., linked with base station A 202). Dual link mode may be employed when wireless terminal 206 is connected to two or more base stations (e.g., linked with base station A 202 and base station B 204). Further, connection evaluator 214 may analyze each of the connections with wireless terminal 206 and preference indicator 216 may transmit data based on the analysis of the connections to each base station 202-204 that indicates if the receiving base station is preferred. Wireless terminal 206 (and/or connection evaluator 214) may measure signal to noise ratio(s) associated with base station(s) related to respective downlink transmissions. These measured values may be provided back to corresponding base stations upon dedicated control channels on the uplink from wireless terminal 206. According to an example, in single link mode, 5 bits may be utilized on the dedicated control channel to indicate signal to noise ratio associated with downlink transmission. Pursuant to a further illustration, when utilizing dual link mode, wireless terminal 206 may utilize 4 bits on the dedicated control channel for signal to noise related data and a fifth bit may be employed to indicate a link preference as selected (e.g., set, unset, etc.) by preference indicator 216. According to another example, the dedicated control channel may carry a link preference indicator at substantially all times (e.g., regardless of a number of connections), and therefore switching between single link and dual link modes may be mitigated.

Base station A 202 and base station B 204 may each include respective preference evaluators (e.g., a preference evaluator 220 and a preference evaluator 222). Preference evaluators 220-222 may interpret the uplink control channels (e.g., DCCH(s)) related to each of the base stations 202-204 (e.g., preference evaluator 220 may monitor the control channel associated with base station B 202 and preference evaluator 222 may monitor the control channel associated with base station B 204). For instance, preference evaluators 220-222 may interpret information obtained over the control channels in a context of dual link mode which means that preference evaluators 220-222 monitor a particular bit corresponding to each of the control channels (e.g., set by preference indicator 216) that indicates whether the particular base station is preferred at a given time (e.g. which may be obtained with any periodicity). In contrast, when in single link mode, base station A 202 and/or preference evaluator 220 may skip monitoring for such bit associated with the control channel. According to a further illustration, if a link preference indicator is utilized at substantially all times, preference evaluator 220 may cease monitoring when aware that wireless terminal 206 is connected to one base station rather than multiple base stations.

Base station A 202 and base station B 204 may additionally include corresponding forwarders (e.g., a forwarder 224 for base station A 202 and a forwarder 226 for base station B 204) and/or downlink transmitters (e.g., a downlink transmitter 228 for base station A 202 and a downlink transmitter 230 for base station B 204). Forwarders 224-226 and downlink transmitters 228-230 may enable routing packets obtained from network 212 to wireless terminal 206. Forwarders 224-226 may forward packets between base stations 202-204 (e.g., from primary base station(s) to secondary base station(s)); thus, forwarder 224 may transfer packets from base station A 202 to base station B 204, for instance. According to one or more aspects, forwarders 224-226 may transmit packet(s) when a corresponding base station 202-204 is the primary base station. Downlink transmitters 228-230 transmit packets on downlinks to wireless terminal 206 corresponding to each of the base stations 202-204; accordingly, downlink transmitters 228-230 utilized in conjunction with preference evaluators 220-222 may enable bicast transmission to wireless terminal 206 based upon the preference indicated by wireless terminal 206 (e.g., via preference indicator 216).

By way of example, base station A 202 may be the primary base station and preference evaluator 220 may determine that base station A 202 is the preferred base station. Accordingly, forwarder 224 may cease forwarding packets (obtained from network 212 since base station A 202 is the primary base station) to base station B 204 (as well as any disparate secondary base stations (not shown)). However, forwarder 224 may continue such forwarding to mitigate a possibility of misinterpretation by preference evaluator 220. In accordance with an example, forwarder 224 may decide whether to forward packets in such a case based upon a number of criteria such as, for instance, quality of service, traffic, flow time, buffer type, and so forth. Moreover, downlink transmitter 228 may send the packets to wireless terminal 206 from base station A 202.

Further, for instance, base station A 202 may be the primary base station and preference evaluator 220 may determine that base station A 202 is not the preferred base station. In such a case, forwarder 224 routes packets to the secondary base station(s) (e.g., base station B 204 as known from data obtained via connection notifier 210). Also, forwarder 224 may enable retaining a copy of the packets at base station A 202.

According to another illustration, preference indicator 216 may notify base station B 204 that it is preferred (and thus implicitly indicate that base station A 202 is not preferred); additionally, base station A 202 may be the primary base station. Accordingly, packets in a queue associated with base station B 204 obtained from base station A 202 via forwarder 224 may be transmitted to wireless terminal 206 by employing downlink transmitter 230. Further, if preference evaluator 222 determines that base station B 204 is not the preferred base station at a later time, downlink transmitter 230 may terminate the downlink transmission to wireless terminal 206.

Figure 3:
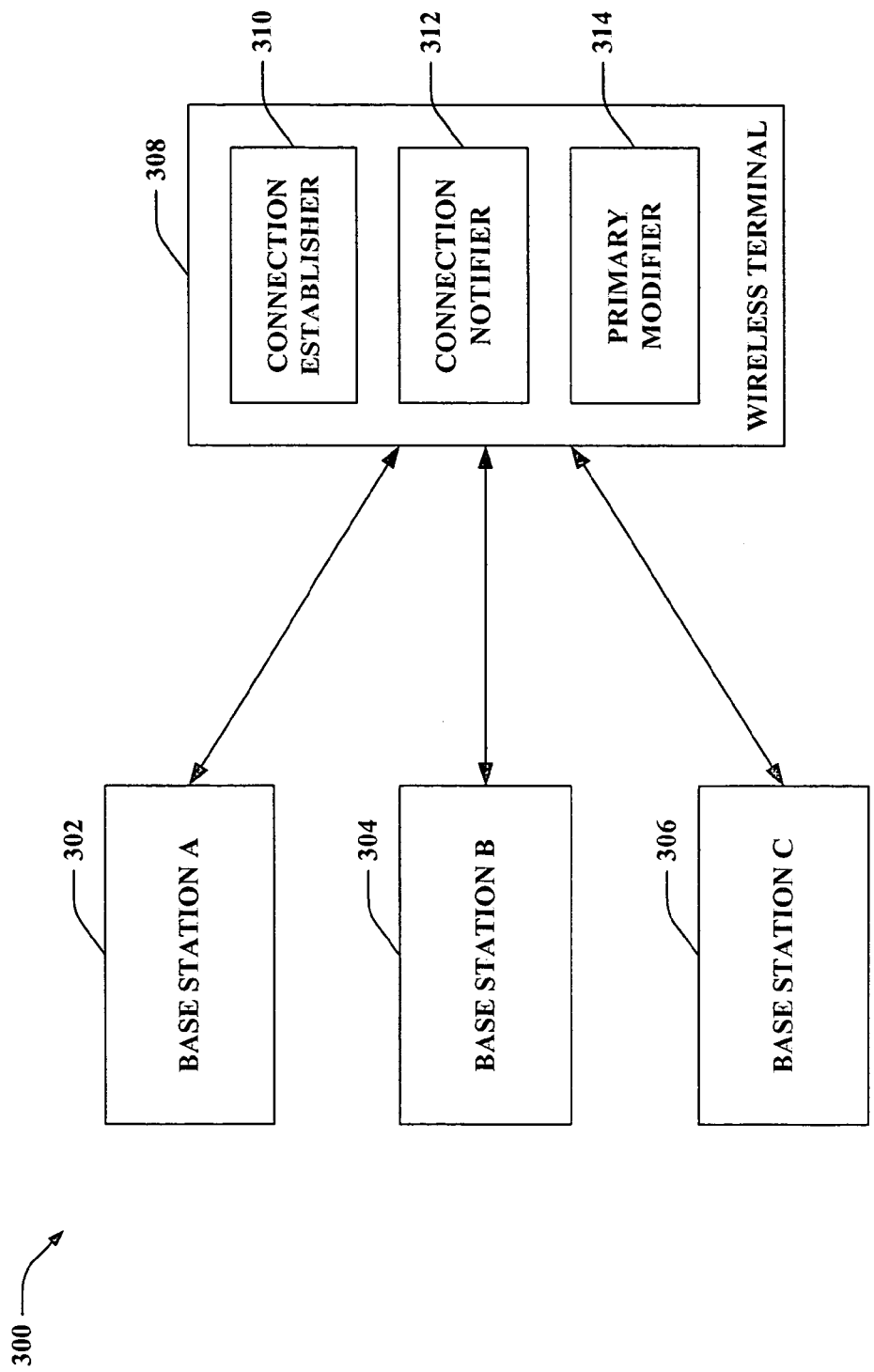
FIG. 3 is an illustration of a system that informs a primary base station about an establishment and/or termination of link(s) with secondary base station(s).

With reference to FIG. 3, illustrated is a system 300 that informs a primary base station about an establishment and/or termination of link(s) with secondary base station(s). System 300 may include any number of base stations (e.g., base station A 302, base station B 304, base station C 306, etc.) and any number of wireless terminals such as wireless terminal 308. It is to be appreciated that wireless terminal 308 may be connected to any number of primary base stations and/or any number of secondary base stations. Although depicted as being connected to three base stations 302-306, it is to be appreciated that wireless terminal 308 may be connected to more or less base stations as noted below in the following examples. Wireless terminal 308 also includes connection establisher 310, connection notifier 312, and/or primary modifier 314 as described above.

According to an example, wireless terminal 308 may be connected to base station A 302. Connection establisher 310 may facilitate forming a link with base station B 304. Further, connection notifier 312 may transmit an indication to base station A 302 concerning the new link established with base station B 304. Thereafter, connection establisher 310 may terminate the connection with base station B 304 and a corresponding notification (e.g., connection drop notification message) may be provided to base station A 302 via connection notifier 312. The notification may explicitly indicate that the connection with base station B 304 has been terminated. Alternatively, the notification may include a list of all connections associated with wireless terminal 308 (e.g., implicitly indicating that the connection with base station B 304 has been dropped). Upon receipt of such notification, base station A 302 may return to single link mode. At a later time, connection establisher 310 may create a link with base station C 306 and a corresponding notification may be provided to base station A 302 with connection modifier 312.

Pursuant to another illustration, wireless terminal 308 may have links with base station A 302 and base station B 304, and base station A 302 may be the primary base station. Since base station A 302 is the primary, a notification previously was provided to it indicating the existence of the link to secondary base station B 304. In contrast, base station B 304 may or may not know of the link between wireless terminal 308 and base station A 302. Wireless terminal 308 may subsequently detect base station C 306 and decide to establish a connection with base station C 306 while dropping the connection with base station B 304, which may be effectuated by connection establisher 310. In response, connection notifier 312 may transmit a message to base station A 302 noting that a connection with base station C 306 has been established and a connection with base station B 304 has been dropped.

By way of a further illustration, wireless terminal 308 may be connected to base station A 302 and base station B 304, with base station A 302 being the primary base station and aware of the secondary base station (e.g., base station B 304). Primary modifier 314 may transmit information that enables switching the primary base station to be base station B 304 instead of base station A 302. After the change, packets from a core network directed to wireless terminal 308 may be routed to base station B 304 rather than base station A 302. Connection notifier 312 may also provide an indication to base station B 304 specifying that base station A 302 is a secondary base station, since base station B 304 was previously a secondary base station and potentially unaware of the existence of the primary base station before the switch effectuated by primary modifier 314. Thus, a primary base station is aware of secondary base station(s), while a secondary base station may not be aware of primary base station(s). (However, according to an example to which the subject claims are not limited, all connected base stations may be aware of an entire connectivity state of wireless terminal 308, and thus, wireless terminal 302 would not need to provide an indication of secondary base station(s) when the primary base station is changed). Further, if wireless terminal 308 was connected to base station A 302, base station B 304, and base station C 306 and changed the primary base station from base station A 302 to base station B 304, connection notifier 312 alerts base station B 304 as to the existence of secondary base station A 302 and secondary base station C 306; however, alerts need not be provided to secondary base station A 302 and secondary base station C 306.

According to another illustration, wireless terminal 308 may be connected to primary base station A 302 and secondary base station B 304. Connection establisher 310 may form a link with base station C 306 while retaining links to base station A 302 and base station B 304. Connection notifier 312 may then transmit a notification to base station A 302 concerning the new connection; thus, base station B 304 and base station C 306 may be unaware of the disparate connections to wireless terminal 308.

Figure 4:
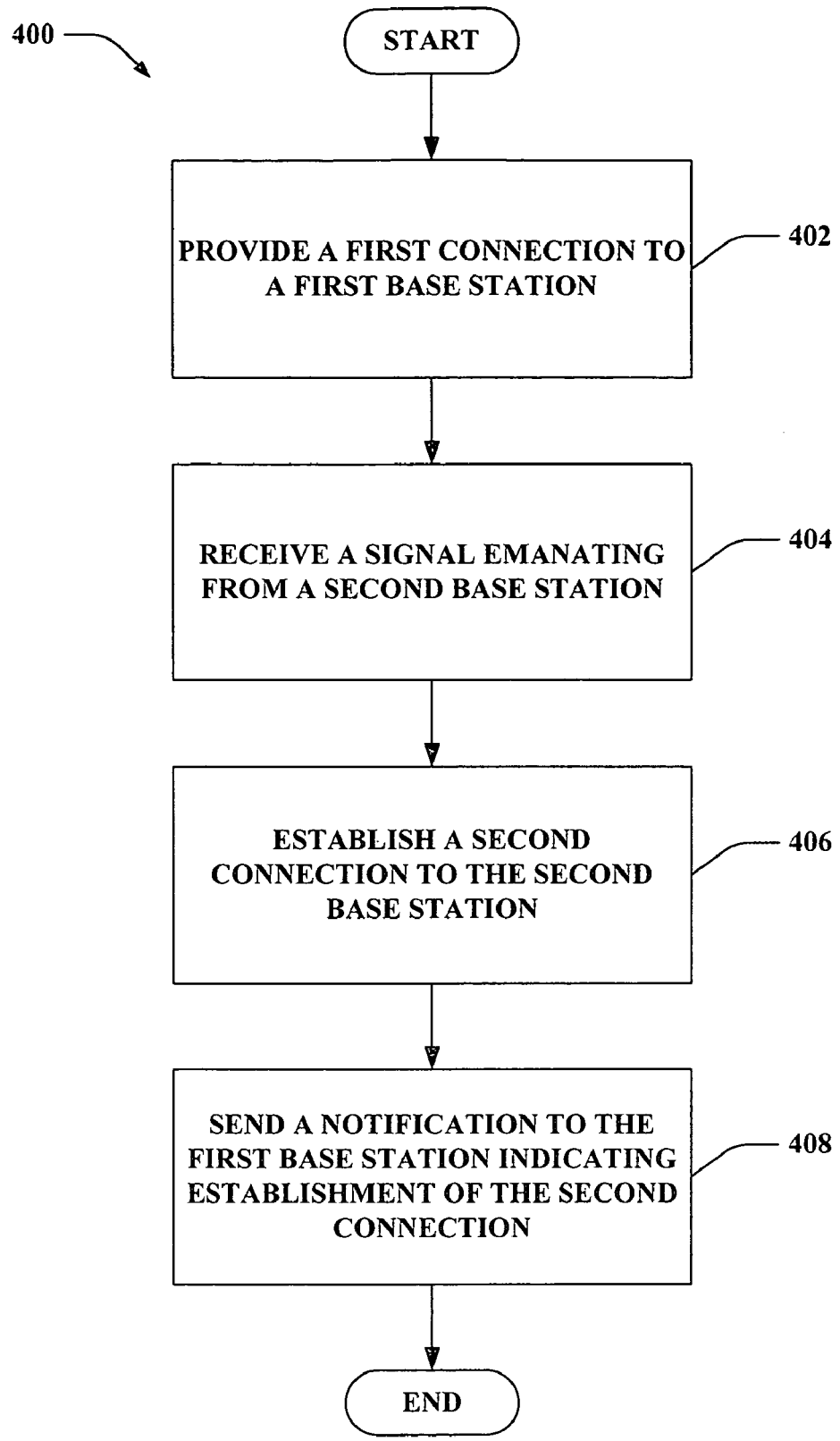
FIG. 4 is an illustration of a methodology that facilitates establishing secondary connection(s) associated with a wireless terminal.
Figure 5:
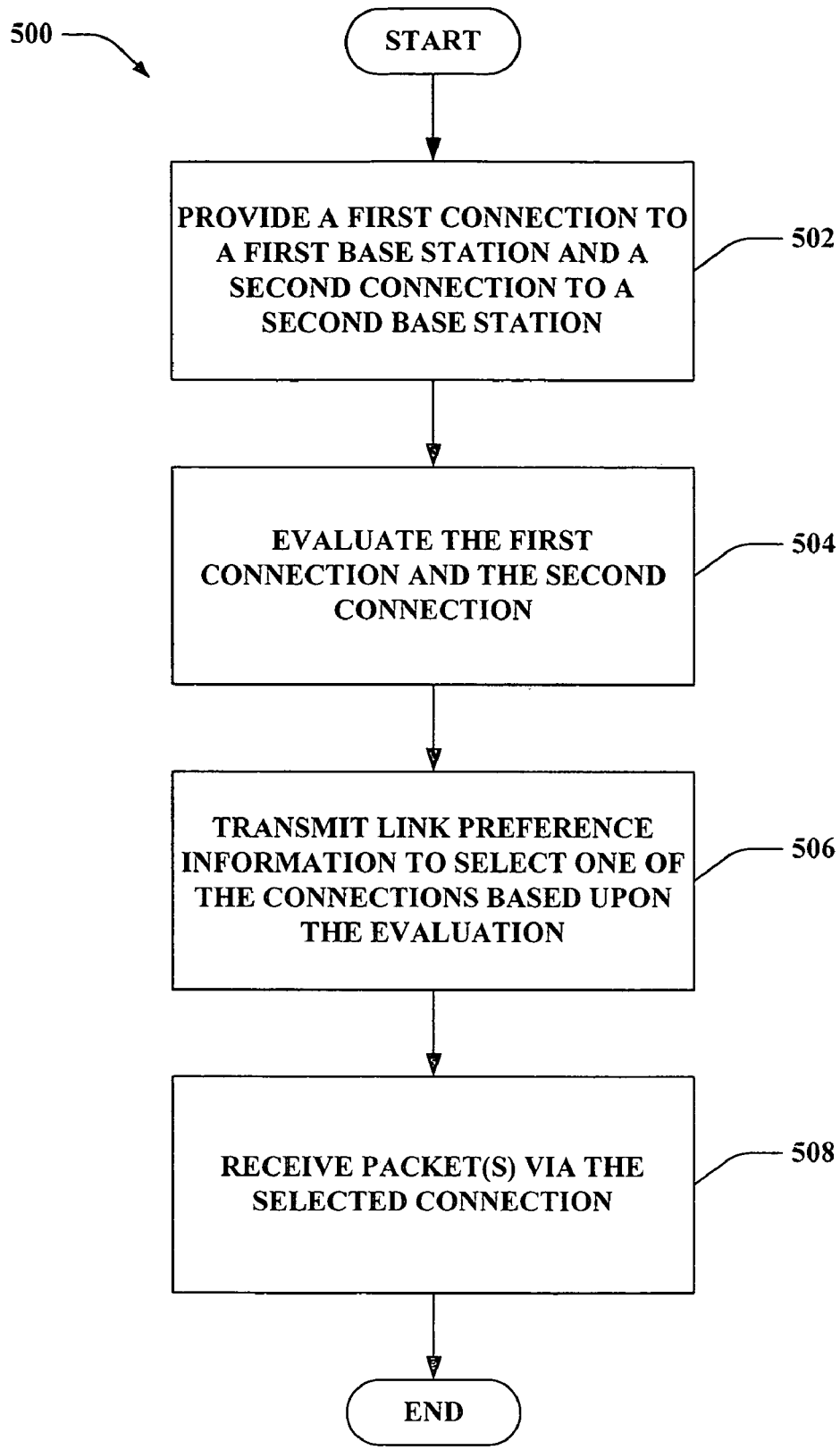
FIG. 5 is an illustration of a methodology that facilitates selecting a connection from a set of connections over which to obtain data packet(s).
Figure 6:
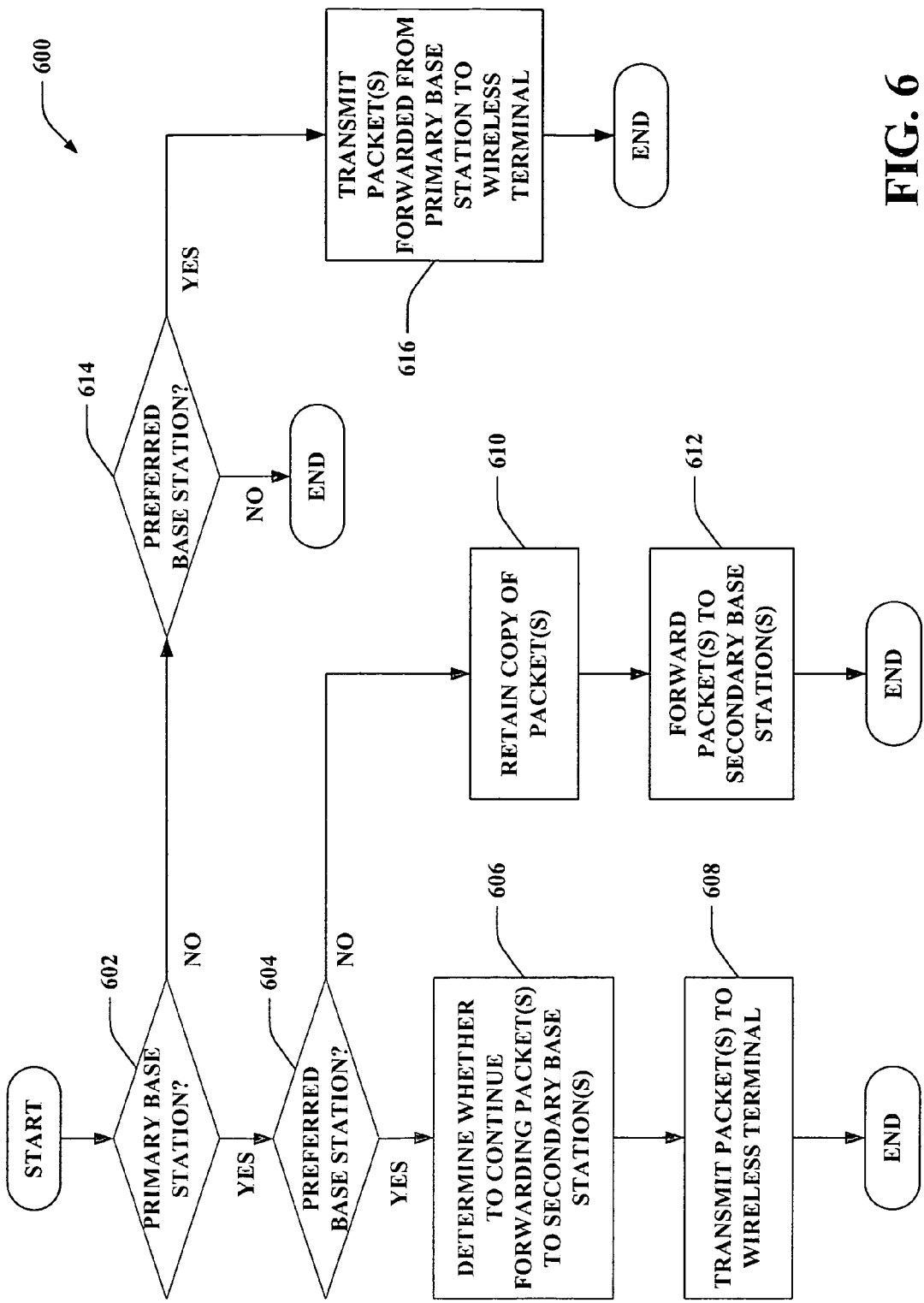
FIG. 6 is an illustration of a methodology that facilitates controlling operation of a base station in connection with routing packet(s) to be transmitted over a downlink to a wireless terminal.

Referring to FIGS. 4-6, methodologies relating to supporting multiple connections and/or routing packet(s) for downlink transfer to wireless terminals utilizing the multiple connections are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 4, illustrated is a methodology 400 that facilitates establishing secondary connection(s) associated with a wireless terminal. At 402, a first connection to a first base station may be provided. For instance, if one connection to one base station is provided, such base station may be considered to be a primary base station upon adding further connection(s) unless this designation is modified. It is to be appreciated that any number of connections to any number of base stations may be provided. At 404, a signal emanating from a second base station may be received. By way of example, the signal may be a beacon. The signal may be evaluated to determine whether to proceed with connecting to the second base station. Thus, analysis of signal strength of the received signal (e.g., beacon, pilot, etc.), signal to noise ratio (SNR), signal to interference ratio (SIR), base station load, type of traffic, and the like may be effectuated to select whether to obtain a connection.

At 406, a second connection to the second base station may be established. For instance, an expedited handoff may be employed to obtain the second connection. Additionally, the first connection may continue to exist subsequent to establishing the second connection; thus, the wireless terminal may be connected to multiple base stations simultaneously. It is contemplated that any number of second connections may concurrently be established. Additionally or alternatively, disparate connection(s) to disparate base station(s) may be terminated (e.g., based upon the aforementioned signal analysis). At 408, a notification indicating establishment of the second connection may be sent to the first base station. It is contemplated that the notification may be sent to a primary base station. The notification may be, for example, a secondary link notification message. Further, the notification may provide that a new connection has been established and/or include an identity of the second base station. For example, the identity of the second base station may be obtained from the received signal (e.g. derived from the beacon). Pursuant to another illustration, the identity of the second base station may be a full identifier received in a message from the second base station. Moreover, a connection drop notification message may be transmitted upon terminating the disparate connection with the disparate base station.

Turning to FIG. 5, illustrated is a methodology 500 that facilitates selecting a connection from a set of connections over which to obtain data packet(s). At 502, a first connection to a first base station and a second connection to a second base station may be provided. For instance, any number of connections to any number of base stations may exist. Further, connection(s) to base station(s) may be added and/or removed. At 504, the first connection and the second connection may be evaluated. For instance, signal strengths corresponding to each of the connections may be analyzed. According to additional examples, signal to noise ratio (SNR), signal to interference ratio (SIR), base station load, type of traffic, and so forth may be considered in connection with each of the connections.

At 506, link preference information may be transmitted to select one of the connections based upon the evaluation. Pursuant to an illustration, the first connection to the first base station may be determined to have a higher signal strength at a particular time as compared to the second connection to the second base station; thus, link preference information related to obtaining data over a downlink associated with the first base station may be sent. The link preference information may be a bit that may be set or unset. Further, the link preference information may be sent over a dedicated control channel (DCCH). Moreover, the link preference information may be transmitted to each base station over respective uplinks corresponding to the base stations, and the link preference information may indicate whether the particular base station to which the information is transmitted is preferred or not preferred. At 508, packet(s) may be received via the selected connection. It is contemplated that any number of packet(s) may be obtained. Further, although not depicted, methodology 500 may return to 504 to update the connection over which packet(s) may be received. For example, such updating may occur periodically (e.g., with a preset period, a dynamically adjusting period, etc.).

Now turning to FIG. 6, illustrated is a methodology 600 that facilitates controlling operation of a base station in connection with routing packet(s) to be transmitted over a downlink to a wireless terminal. At 602, a determination may be effectuated as to whether the base station is a primary base station. A primary base station may obtain data from a core network routed towards a wireless terminal. Alternatively, it may be identified if the base station is a secondary base station, and hence, not a primary base station. If the base station is a primary base station, methodology 600 proceeds to 604. At 604, it is determined whether the base station is a preferred base station. Received link preference information may be evaluated to effectuate such determination. For example, a dedicated control channel associated with the base station may be monitored for link preference bits. According to this example, when the link preference bit is set, the receiving base station is preferred, and if the link preference bit is not set, the receiving base station is not the preferred base station. If the base station is determined to be the preferred base station, methodology 600 continues at 606. At 606, a determination may be made as to whether to continue forwarding packet(s) to secondary base station(s). Any number of secondary base station(s) may be associated with the wireless terminal. The decision to continue forwarding packet(s) may be based upon criteria related to, for instance, quality of service, traffic, flow time, buffer type, and the like. Accordingly, base station may continue and/or cease forwarding packet(s) to the secondary base station(s). At 608, packet(s) may be transmitted to the wireless terminal. Hence, a base station that is both the primary base station and the preferred base station may transmit packet(s) to the wireless terminal and decide whether to continue and/or discontinue forwarding packet(s) to secondary base station(s).

If the base station is determined to be the primary base station at 602 and not the preferred base station at 604, then methodology 600 continues to 610. At 610, a copy of packet(s) may be retained. For instance, the packet(s) may be obtained from the core network and copied. At 612, the packet(s) may be forwarded to secondary base station(s). Thus, the packet(s) may be transferred to disparate base station(s) known to have a connection with the wireless terminal.

If it is determined that the base station is not the primary base station at 602, then the methodology 600 continues to 614. At 614, a determination as to whether the base station is the preferred base station may be effectuated. If the base station is not the preferred base station, then the methodology 600 ends. However, if the base station is the preferred base station, the methodology proceeds to 616. At 616, packet(s) forwarded from a primary base station may be transmitted to the wireless terminal. Accordingly, when a primary base station is not the preferred base station, the packet(s) may be forwarded to the secondary base station(s) (e.g., as described at 612) and one of the secondary base station(s) determined to be preferred may transmit the packet(s) to the wireless terminal.

It will be appreciated that, in accordance with one or more aspects described herein, inferences can be made regarding selecting primary and/or preferred base stations from a set of base stations and/or evaluating whether to forward packet(s) obtained from a core network to secondary base station(s). As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding selecting a primary base station and/or a preferred base station from a set of base stations. By way of further illustration, an inference may be made as to whether packet(s) should be forwarded to secondary base stations from a primary, preferred base station. It will be appreciated that the foregoing examples are illustrative in nature and are not intended to limit the number of inferences that can be made or the manner in which such inferences are made in conjunction with the various embodiments and/or methods described herein.

Figure 7:
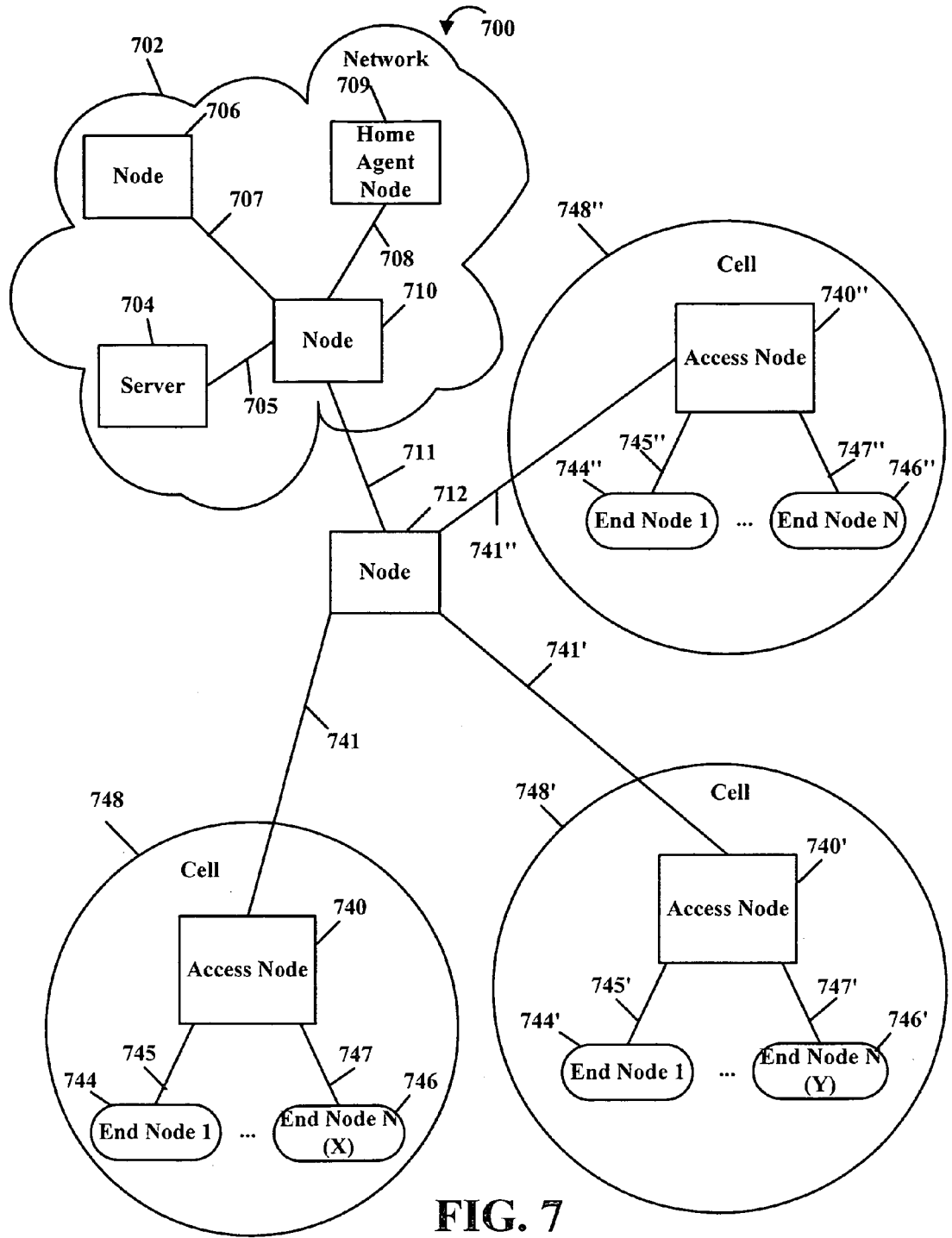
FIG. 7 is an illustration of an exemplary communication system (e.g., a cellular communication network) implemented in accordance with various aspects.

With reference to FIG. 7, illustrated is an exemplary communication system 700 (e.g., a cellular communication network) implemented in accordance with various aspects, which comprises a plurality of nodes interconnected by communications links. Nodes in exemplary communication system 700 exchange information using signals (e.g., messages) based on communication protocols (e.g., the Internet Protocol (IP)). The communications links of system 700 may be implemented, for example, using wires, fiber optic cables, and/or wireless communications techniques. Exemplary communication system 700 includes a plurality of end nodes 744, 746, 744', 746', 744", 746", which access communication system 700 via a plurality of access nodes 740, 740', and 740". End nodes 744, 746, 744', 746', 744", 746" may be, e.g., wireless communication devices or terminals, and access nodes 740, 740', 740" may be, e.g., wireless access routers or base stations. Exemplary communication system 700 also includes a number of other nodes 704, 706, 709, 710, and 712, used to provide interconnectivity or to provide specific services or functions. Specifically, exemplary communication system 700 includes a Server 704 used to support transfer and storage of state pertaining to end nodes. The Server node 704 may be an AAA server, a Context Transfer Server, a server including both AAA server functionality and Context Transfer server functionality.

Exemplary communication system 700 depicts a network 702 that includes Server 704, node 706 and a home agent node 709, which are connected to an intermediate network node 710 by corresponding network links 705, 707 and 708, respectively. Intermediate network node 710 in network 702 also provides interconnectivity to network nodes that are external from the perspective of network 702 via network link 711. Network link 711 is connected to another intermediate network node 712, which provides further connectivity to a plurality of access nodes 740, 740', 740" via network links 741, 741', 741", respectively.

Each access node 740, 740', 740" is depicted as providing connectivity to a plurality of N end nodes (744, 746), (744', 746'), (744", 746"), respectively, via corresponding access links (745, 747), (745', 747'), (745", 747"), respectively. In exemplary communication system 700, each access node 740, 740', 740" is depicted as using wireless technology (e.g., wireless access links) to provide access. A radio coverage area (e.g., communications cells 748, 748', and 748") of each access node 740, 740', 740", respectively, is illustrated as a circle surrounding the corresponding access node.

Exemplary communication system 700 is presented as a basis for the description of various aspects set forth herein. Further, various disparate network topologies are intended to fall within the scope of the claimed subject matter, where the number and type of network nodes, the number and type of access nodes, the number and type of end nodes, the number and type of Servers and other Agents, the number and type of links, and the interconnectivity between nodes may differ from that of exemplary communication system 700 depicted in FIG. 7. Additionally, functional entities depicted in exemplary communication system 100 may be omitted or combined. Also, the location or placement of the functional entities in the network may be varied.

Figure 8:
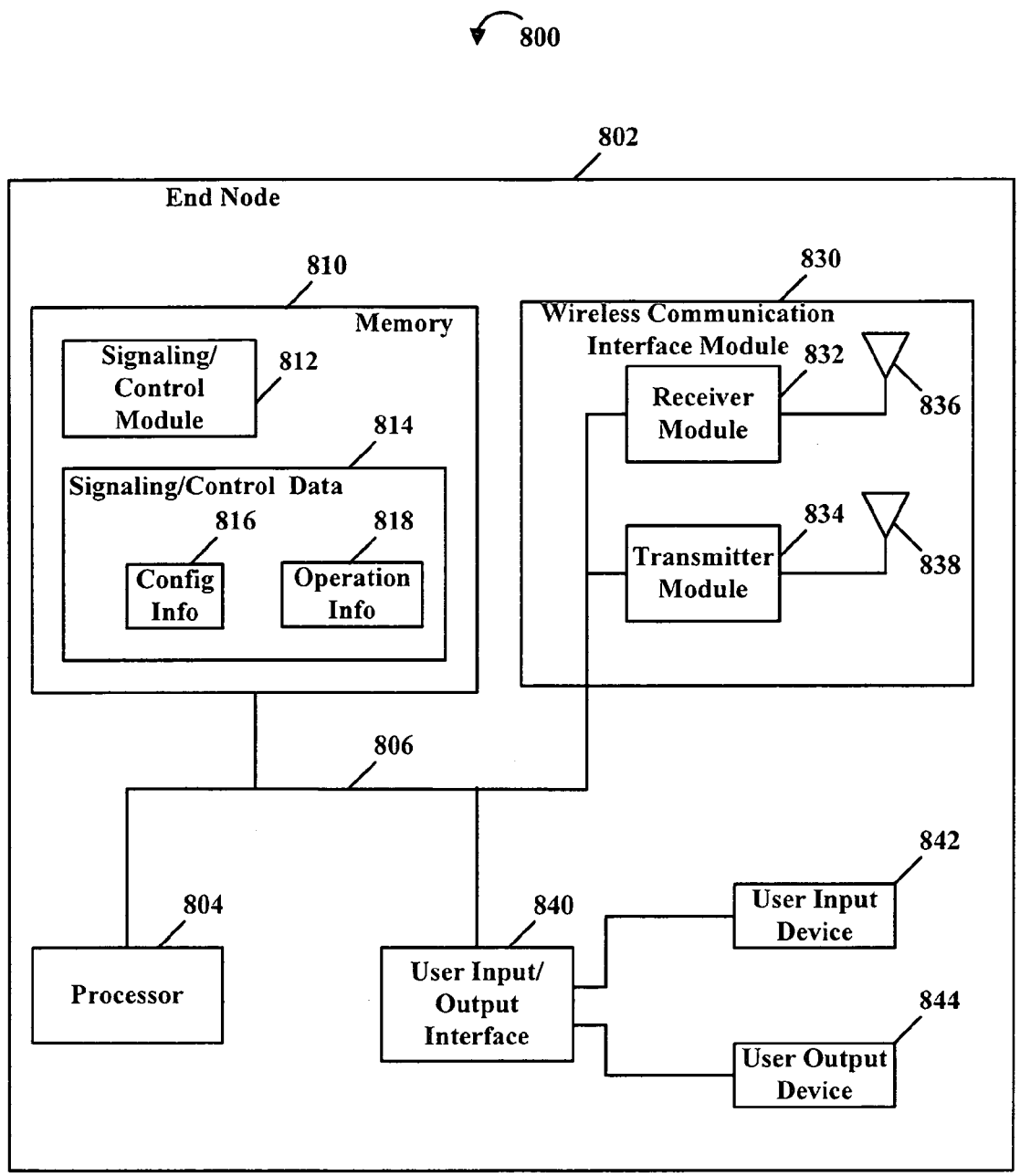
FIG. 8 is an illustration of an exemplary end node (e.g., a mobile node) associated with various aspects.

FIG. 8 illustrates an exemplary end node 800 (e.g., a mobile node) associated with various aspects. Exemplary end node 800 may be an apparatus that may be used as any one of the end nodes 744, 746, 744', 746', 744", 746" depicted in FIG. 7. As depicted, end node 800 includes a processor 804, a wireless communication interface 830, a user input/output interface 840 and memory 810 coupled together by a bus 806. Accordingly, various components of end node 800 can exchange information, signals and data via bus 806. Components 804, 806, 810, 830, 840 of end node 800 may be located inside a housing 802.

Wireless communication interface 830 provides a mechanism by which the internal components of the end node 800 can send and receive signals to/from external devices and network nodes (e.g., access nodes). Wireless communication interface 830 includes, for example, a receiver module 832 with a corresponding receiving antenna 836 and a transmitter module 834 with a corresponding transmitting antenna 838 used for coupling end node 800 to other network nodes (e.g., via wireless communications channels).

Exemplary end node 800 also includes a user input device 842 (e.g., keypad) and a user output device 844 (e.g., display), which are coupled to bus 806 via user input/output interface 840. Thus, user input device 842 and user output device 844 can exchange information, signals and data with other components of end node 800 via user input/output interface 840 and bus 806. User input/output interface 840 and associated devices (e.g., user input device 842, user output device 844) provide a mechanism by which a user can operate end node 800 to accomplish various tasks. In particular, user input device 842 and user output device 844 provide functionality that allows a user to control end node 800 and applications (e.g., modules, programs, routines, functions, etc.) that execute in memory 810 of end node 800.

Processor 804 may be under control of various modules (e.g., routines) included in memory 810 and may control operation of end node 800 to perform various signaling and processing as described herein. The modules included in memory 810 are executed on startup or as called by other modules. Modules may exchange data, information, and signals when executed. Modules may also share data and information when executed. Memory 810 of end node 800 may include a signaling/control module 812 and signaling/control data 814.

Signaling/control module 812 controls processing relating to receiving and sending signals (e.g., messages) for management of state information storage, retrieval, and processing. Signaling/control data 814 includes state information such as, for instance, parameters, status, and/or other information relating to operation of the end node. In particular, signaling/control data 814 may include configuration information 816 (e.g., end node identification information) and operational information 818 (e.g., information about current processing state, status of pending responses, etc.). Signaling/control module 812 may access and/or modify signaling/control data 814 (e.g., update configuration information 816 and/or operational information 818).

Figure 9:
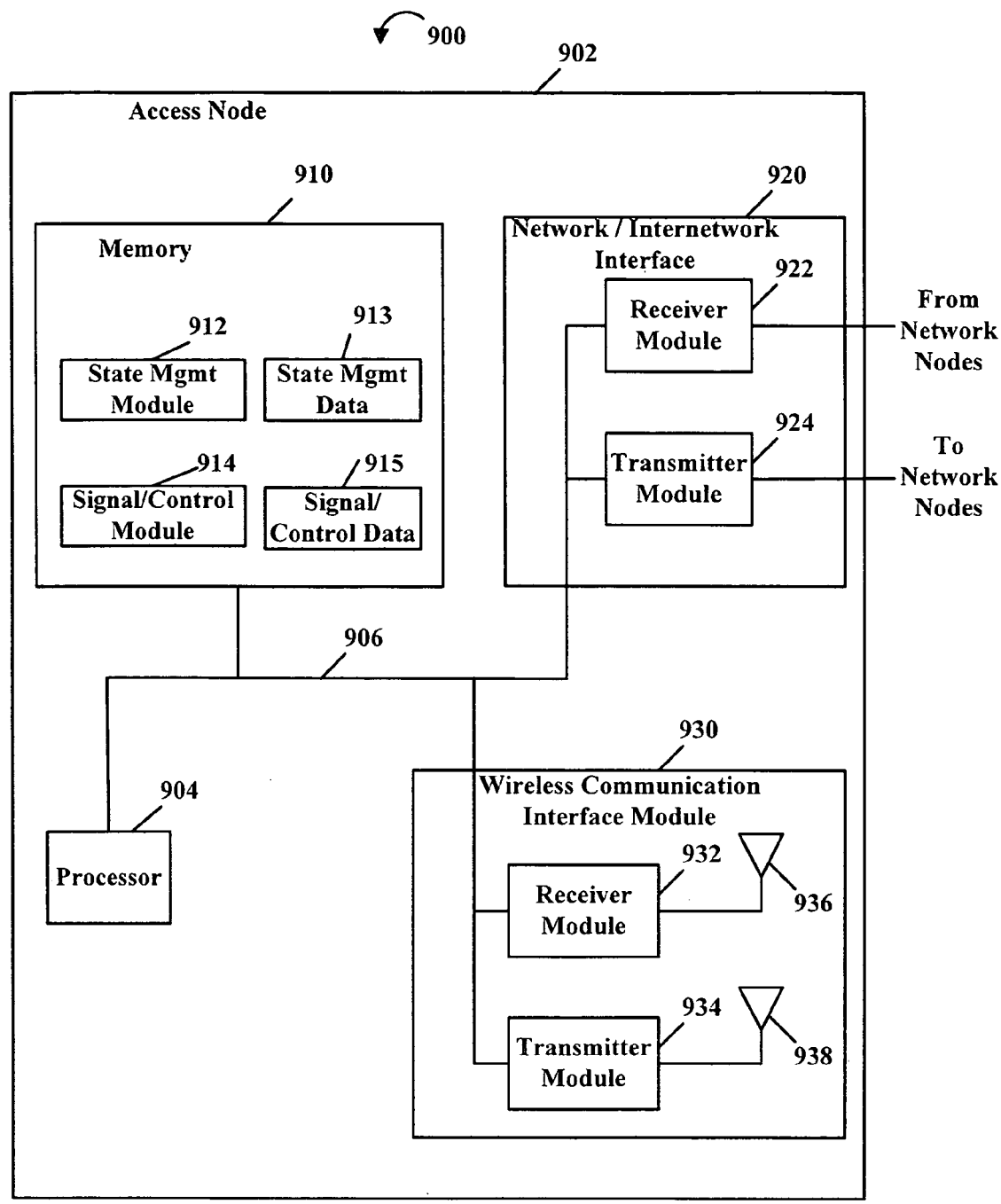
FIG. 9 is an illustration of an exemplary access node implemented in accordance with various aspects described herein.

FIG. 9 provides an illustration of an exemplary access node 900 implemented in accordance with various aspects described herein. Exemplary access node 900 may be an apparatus utilized as any one of access nodes 740, 740', 740" depicted in FIG. 7. Access node 900 includes a processor 904, memory 910, a network/internetwork interface 920 and a wireless communication interface 930, coupled together by a bus 906. Accordingly, various components of access node 900 can exchange information, signals and data via bus 906. The components 904, 906, 910, 920, 930 of the access node 900 may be located inside a housing 902.

Network/internetwork interface 920 provides a mechanism by which the internal components of access node 900 can send and receive signals to/from external devices and network nodes. Network/internetwork interface 920 includes a receiver module 922 and a transmitter module 924 used for coupling access node 900 to other network nodes (e.g., via copper wires or fiber optic lines). Wireless communication interface 930 also provides a mechanism by which the internal components of access node 900 can send and receive signals to/from external devices and network nodes (e.g., end nodes). Wireless communication interface 930 includes, for instance, a receiver module 932 with a corresponding receiving antenna 936 and a transmitter module 934 with a corresponding transmitting antenna 938. Wireless communication interface 930 may be used for coupling access node 900 to other network nodes (e.g., via wireless communication channels).

Processor 904 under control of various modules (e.g., routines) included in memory 910 controls operation of access node 900 to perform various signaling and processing. The modules included in memory 910 may be executed on startup or as called by other modules that may be present in memory 910. Modules may exchange data, information, and signals when executed. Modules may also share data and information when executed. By way of example, memory 910 of access node 900 may include a State Management module 912 and a Signaling/Control module 914. Corresponding to each of these modules, memory 910 also includes State Management data 913 and the Signaling/Control data 915.

State Management Module 912 controls the processing of received signals from end nodes or other network nodes regarding state storage and retrieval. State Management Data 913 includes, for instance, end-node related information such as the state or part of the state, or the location of the current end node state if stored in some other network node. State Management module 912 may access and/or modify State Management data 913.

Signaling/Control module 914 controls the processing of signals to/from end nodes over wireless communication interface 930 and to/from other network nodes over network/internetwork interface 920 as necessary for other operations such as basic wireless function, network management, etc. Signaling/Control data 915 includes, for example, end-node related data regarding wireless channel assignment for basic operation, and other network-related data such as the address of support/management servers, configuration information for basic network communications. Signaling/Control module 914 may access and/or modify Signaling/Control data 915.

Figure 10:
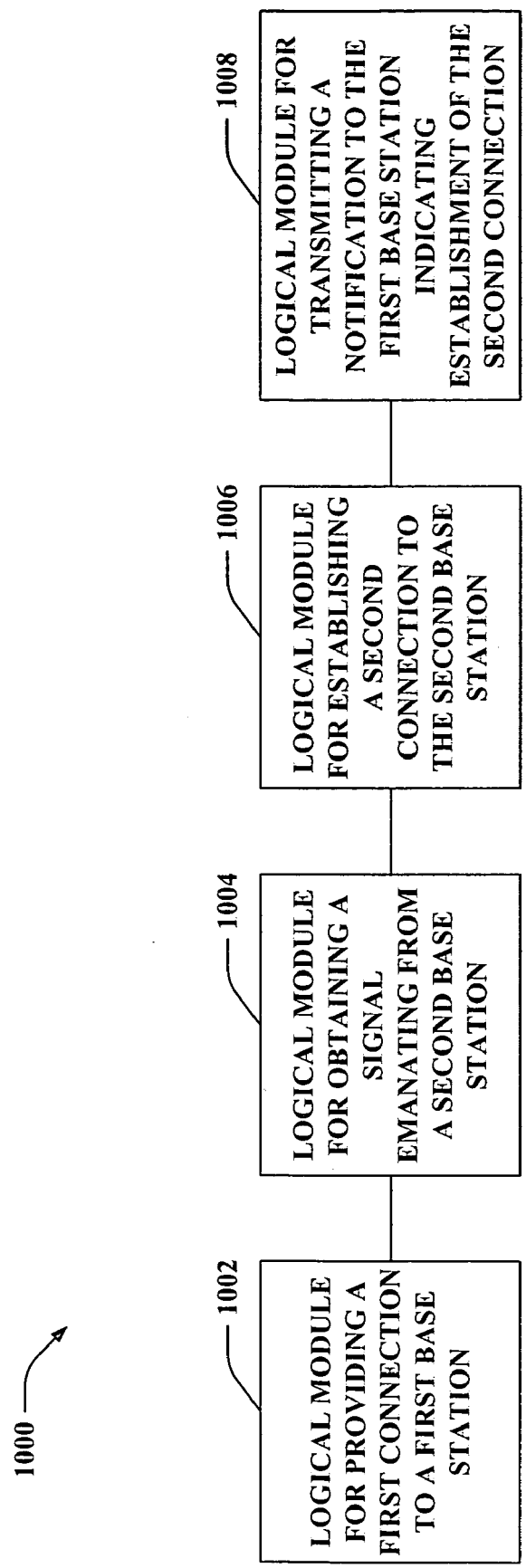
FIG. 10 is an illustration of a system that provides notifications associated with newly established connections to a primary base station.

With reference to FIG. 10, illustrated is a system 1000 that provides notifications associated with newly established connections to a primary base station. It is to be appreciated that system 1000 is represented as including functional blocks, which can be functional blocks that represent functions implemented by a processor, software, or combination thereof (e.g., firmware). System 1000 can be implemented in a wireless terminal and can include a logical module for providing a first connection to a first base station 1002. It is contemplated that any number of connections to any number of base stations may be provided. Further, system 1000 may comprise a logical module for obtaining a signal emanating from a second base station 1004. For example, the signal may be a beacon. Moreover, the signal may be evaluated to determine whether to proceed with forming a connection with the second base station. System 1000 may also include a logical module for establishing a second connection to the second base station 1006. Moreover, system 1000 may comprise a logical module for transmitting a notification to the first base station indicating establishment of the second connection 1008.

Figure 11:
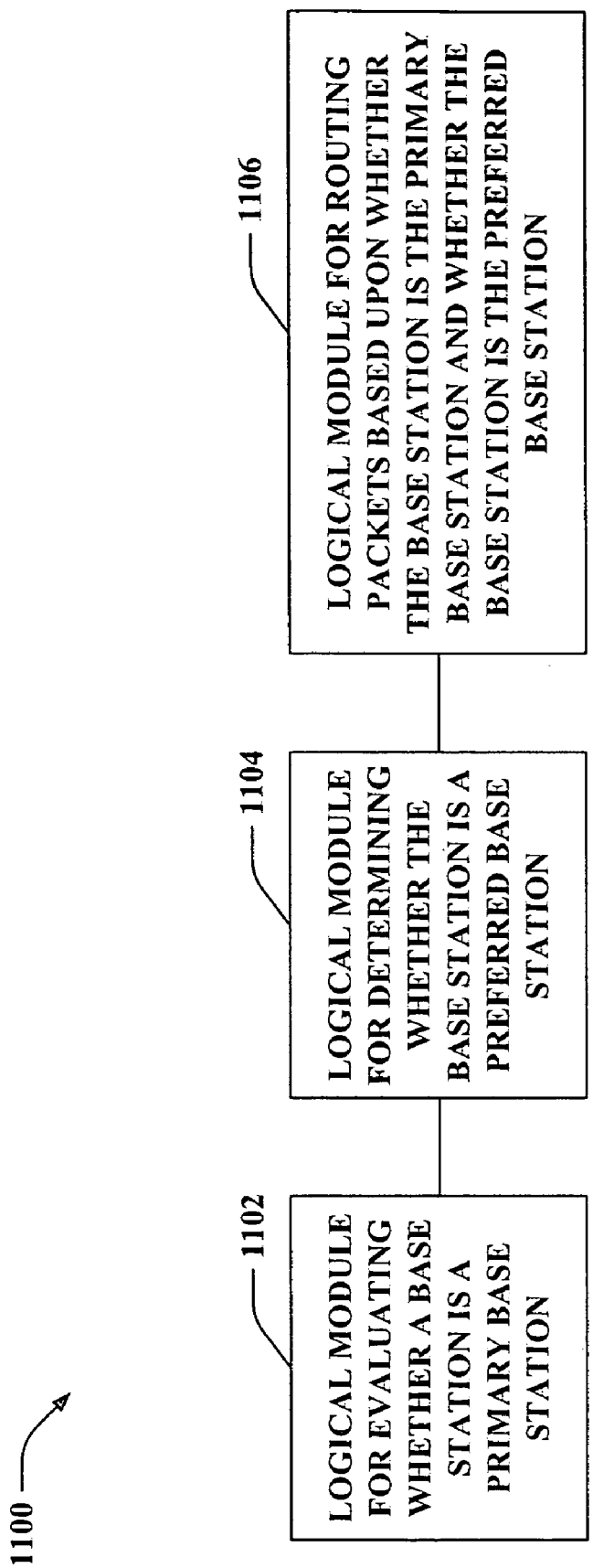
FIG. 11 is an illustration of a system that facilitates routing packets.

Now referring to FIG. 11, illustrated is a system 1100 that facilitates routing packets. System 1100 is represented as including functional blocks, which may represent functions implemented by a processor, software, or combination thereof (e.g., firmware). System 1100 may be implemented in a base station and may include a logical module for evaluating whether a base station is a primary base station. Additionally, system 1100 may comprise a logical module for determining whether the base station is a preferred base station. For instance, link preference information obtained over a dedicated control channel associated with the base station may be monitored. System 1100 may also include a logical module for routing packets based upon whether the base station is the primary base station and whether the base station is the preferred base station.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates supporting multiple connections associated with a wireless terminal, comprising:
   providing a first connection to a first base station;
   receiving a signal emanating from a second base station;
   establishing a second connection to the second base station;
   sending a notification to the first base station indicating establishment of the second connection;
   evaluating the first connection and the second connection:
   transmitting link preference information to select one of the first connection and the second connection based upon the evaluation; and
   receiving a packet via the selected connection pertaining to the link preference information.

2. The method of claim 1, wherein the notification includes an identity of the second base station.

3. The method of claim 1, further comprising:
   establishing a third connection with a third base station; and
   sending a notification to the first base station indicating establishment of the third connection.

4. The method of claim 1, further comprising:
   terminating a third connection with a third base station; and
   sending a notification to the first base station indicating termination of the third base station.

5. The method of claim 1, further comprising:
   establishing a third connection with a third base station;
   terminating the second connection with the second base station; and
   notifying the first base station of the established third connection and terminated second connection.

6. The method of claim 1, further comprising:
   selecting the second base station to be a primary base station; and
   notifying the second base station of an existence of one or more secondary connections.

7. The method of claim 1, further comprising deriving at least a partial identifier related to the second base station from the received signal emanating from the second base station, wherein the signal emanating from the second base station is a beacon.

8. The method of claim 1, further comprising:
   analyzing the signal emanating from the second base station; and
   determining whether to establish the second connection to the second base station.

9. The method of claim 1, further comprising transmitting a signal to the second base station to select the second base station as a primary base station, wherein the primary base station obtains data from a core network routed towards the wireless terminal.

10. The method of claim 1, wherein the link preference information is a bit.

11. The method of claim 1, wherein the link preference information is transmitted via a dedicated control channel.

12. The method of claim 1, wherein the link preference information is transmitted to both the first base station and the second base station.

13. A wireless communications apparatus for providing notifications associated with newly established connections to a primary base station, comprising:
   means for providing a first connection to a first base station;
   means for obtaining a signal emanating from a second base station;
   means for establishing a second connection to the second base station;
   means for transmitting a notification to the first base station indicating establishment of the second connection:
   means for evaluating the first connection and the second connection;
   means for transmitting link preference information that identifies a preferred base station; and
   means for obtaining a packet via the preferred base station.

14. The wireless communications apparatus of claim 13, further comprising:
   means for determining whether to establish the second connection to the second base station based at least in part upon the obtained signal emanating from the second base station.

15. A tangible, non-transitory machine-readable storage medium having stored thereon machine-executable instructions for:
   obtaining a signal emanating from a second base station;
   creating a second connection to the second base station;
   transmitting a notification to a first base station indicating establishment of the second connection:
   evaluating a first connection to the first base station and the second connection to the second base station:
   transmitting link preference information that identifies a preferred base station; and
   obtaining a packet via the preferred base station.

16. The tangible, non-transitory machine-readable storage medium of claim 15,
   wherein the link preference information is a bit.

17. The tangible, non-transitory machine-readable storage medium of claim 15, the machine-executable instructions further comprise:
   terminating a third connection with a third base station; and sending a notification to the first base station indicating termination of the third base station, wherein the first base station is a primary base station.

18. A wireless communication apparatus, comprising:
circuitry con figured to provide a first connection to a first base station, receive a signal emanating from a second base station, establish a second connection to the second base station, send a notification to the first base station indicating establishment of the second connection, evaluate the first connection and the second connection, transmit link preference information to select one of the first connection and the second connection based upon the evaluation, and receive a packet via the selected connection pertaining to the link preference information.

* * * * *